(12) United States Patent  (10) Patent No.: US 7,859,961 B2
Nakaseko et al.  (45) Date of Patent: Dec. 28, 2010

(54) OPTICAL DISK RECORDING METHOD AND OPTICAL DISK RECORDING APPARATUS

(75) Inventors: Tetsuji Nakaseko, Fukuoka (JP); Hisao Osabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 582 days.

(21) Appl. No.: 11/775,935

(22) Filed: Jul. 11, 2007

(65) Prior Publication Data

US 2008/0019259 A1  Jan. 24, 2008

(30) Foreign Application Priority Data

Jul. 19, 2006  (JP) .............................. 2006-196406

(51) Int. Cl.
 *G11B 7/00*  (2006.01)
(52) U.S. Cl. ................... 369/47.28; 369/53.34
(58) Field of Classification Search ........................ None
 See application file for complete search history.

(56) References Cited

U.S. PATENT DOCUMENTS

2002/0018415 A1* 2/2002 Kuroda et al. ............. 369/47.28
2004/0037185 A1* 2/2004 Tawaragi ................. 369/47.28
2005/0088935 A1* 4/2005 Nakata et al. ............. 369/47.27

FOREIGN PATENT DOCUMENTS

| JP | 1999-345462 | 12/1999 |
| JP | 2000-040302 | 2/2000 |
| JP | 2003-123403 | 4/2003 |
| JP | 2004-046924 | 2/2004 |
| JP | 2004-178743 | 6/2004 |
| JP | 2005-322407 | 11/2005 |

OTHER PUBLICATIONS

Japanese Office Action dated Jun. 10, 2008 for Application No. 2006-196406.

* cited by examiner

*Primary Examiner*—Wayne R Young
*Assistant Examiner*—Brian Butcher
(74) *Attorney, Agent, or Firm*—SNR Denton US LLP (57) ABSTRACT

An optical disk recording method for recording predetermined data on an optical disk on the basis of a first reference clock signal used for recording, the optical disk including a groove track having a wobble signal recorded thereon and a land track having a land pre-pit carrying track position information, the first reference clock signal being generated on the basis of the wobble signal reproduced from the optical disk, includes the steps of reproducing a pre-pit signal from the optical disk; generating a second reference clock signal from the pre-pit signal; detecting an amount of phase shift of the first reference clock signal using the second reference clock signal; and correcting the first reference clock signal on the basis of an average value of the detected amount of phase shift.

8 Claims, 12 Drawing Sheets

OPTICAL DISK RECORDING METHOD AND OPTICAL DISK RECORDING APPARATUS

CROSS REFERENCES TO RELATED APPLICATIONS

The present invention contains subject matter related to Japanese Patent Application JP 2006-196406 filed in the Japanese Patent Office on Jul. 19, 2006, the entire contents of which are incorporated herein by reference.

BACKGROUND OF THE INVENTION

1. Field of the Invention

The present invention relates to optical disk recording methods and optical disk recording apparatuses. More specifically, the present invention relates to an optical disk recording method for recording data on an optical disk including a groove track on which a wobble signal is recorded and a land track having land pre-pits carrying track position information, and an optical disk recording apparatus.

2. Description of the Related Art

An optical disk such as a digital versatile disk-recordable/rewritable (DVD-R/RW) disk generally has, on a recording surface thereof, a groove track on which a wobble signal is recorded and a land track having land pre-pits carrying track position information.

When desired data is written to such an optical disk using an optical disk recording apparatus, an optical pickup reads the wobble signal from the groove track to generate a recording reference clock signal from the wobble signal. The data is written to the optical disk on the basis of the reference clock signal.

In the optical disk recording apparatus, the optical pickup further reads a pre-pit signal from the land track to reproduce, from the pre-pit signal, address/data information having a predetermined phase relationship with the wobble signal. The data is written to the optical disk on the basis of the address/data information.

With the recent progress on high-density optical disks, there has been a tendency to narrow the track pitch between the groove track and the land track. Thus, when a beam is irradiated onto the optical disk from the optical pickup, the phase of the wobble signal is likely to change due to the signal leakage from the adjacent groove track. The influence of the adjacent groove track, which causes such changes in the phase of the wobble signal, is called "crosstalk".

Since the phase shift induced by crosstalk has an unfixed value but periodically fluctuates in accordance with the shape of the adjacent groove track, it is difficult to cancel the phase shift simply by applying an offset. Due to the phase shift, a recording position may not be located within a standard range when predetermined data is written to the optical disk.

Figure 12:
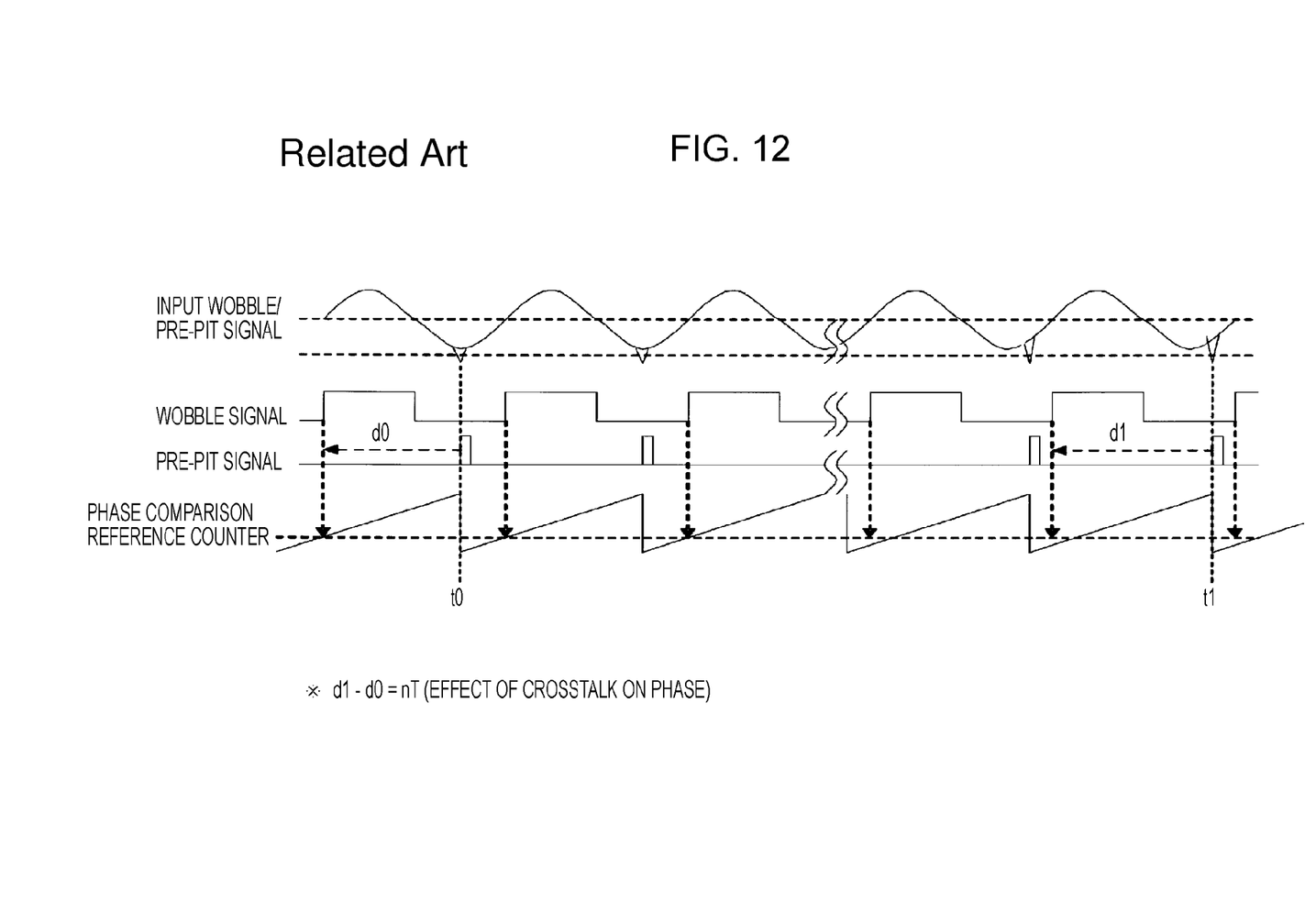
FIG. 12 is a timing diagram showing a problem with a system of the related art.

FIG. 12 shows the relationship between a phase comparison reference counter and a pre-pit signal. As shown in FIG. 12, the phase comparison reference counter operates in response to the pre-pit signal. At time t0, a wobble signal is not affected by the influence of crosstalk, and has no phase difference from the pre-pit signal. However, at time t1, the wobble signal is affected by the influence of crosstalk, and has a phase difference from the pre-pit signal.

Figure 13:
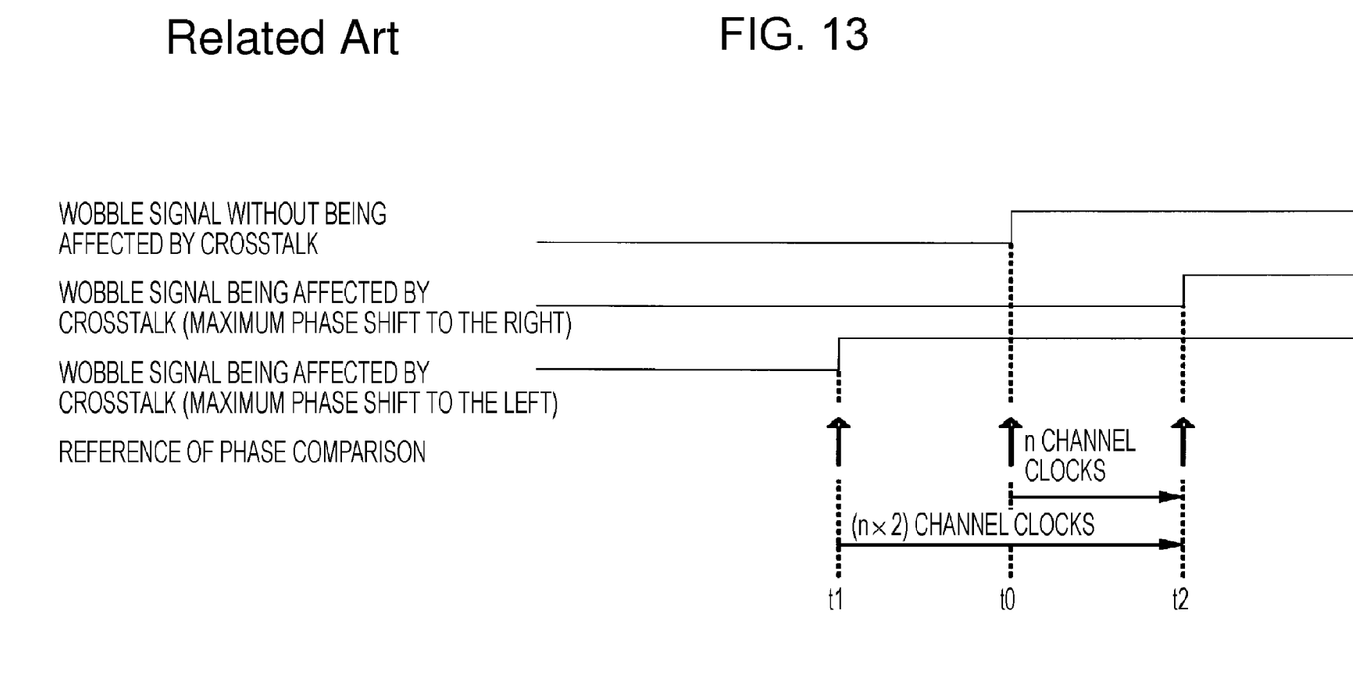
FIG. 13 is a timing diagram showing another problem with a system of the related art.

FIG. 13 shows phase comparison. As shown in FIG. 13, if the recording operation starts at time t0 and ends at time t2, an interval of the recording end position relative to the recording start position corresponds to a period of n channel clocks, which are maximally affected by crosstalk. On the other hand, if the recording operation starts at time t1 and ends at time t2, the wobble signal is maximally affected by crosstalk in the opposite direction at the end of the recording operation in response to the n channel clocks, which are maximally affected by crosstalk, and the maximum phase difference amounts to n×2 channel clocks.

To solve such a problem, a method of feeding back a phase difference between a wobble signal and a pre-pit signal to correct a phase shift of the wobble signal has been proposed (see, for example, Japanese Unexamined Patent Application Publication No. 2005-322407).

SUMMARY OF THE INVENTION

In the case where a phase difference between a wobble signal and a pre-pit signal is fed back to correct a phase shift of the wobble signal, the pre-pit signal is necessary. However, with the recent high-speed recording or reproduction or multiple recording layers, the read rate of the pre-pit signal may be lowered during or after the recording of predetermined data, resulting in failure of phase shift correction.

It is therefore desirable to provide an optical disk capable of high-speed processing and having multiple recording layers, which does not depend on the quality of a pre-pit signal during recording.

According to an embodiment of the present invention, there is provided an optical disk recording method for recording predetermined data on an optical disk on the basis of a first reference clock signal used for recording, the optical disk including a groove track having a wobble signal recorded thereon and a land track having a land pre-pit carrying track position information, the first reference clock signal being generated on the basis of the wobble signal reproduced from the optical disk. The method includes the steps of reproducing a pre-pit signal from the optical disk; generating a second reference clock signal from the pre-pit signal; detecting an amount of phase shift of the first reference clock signal using the second reference clock signal; and correcting the first reference clock signal on the basis of an average value of the detected amount of phase shift.

According to another embodiment of the present invention, there is provided an optical disk recording apparatus for recording predetermined data on an optical disk including a groove track having a wobble signal recorded thereon and a land track having a land pre-pit carrying track position information. The apparatus includes wobble signal reproducing means for reproducing the wobble signal from the optical disk; first reference clock signal generating means for generating a first reference clock signal used for recording from the wobble signal, the predetermined data being recorded on the optical disk on the basis of the first reference clock signal; pre-pit signal reproducing means for reproducing a pre-pit signal from the optical disk; second reference clock signal generating means for generating a second reference clock signal from the pre-pit signal; shift-amount detecting means for detecting an amount of phase shift of the first reference clock signal using the second reference clock signal; and correcting means for correcting the first reference clock signal on the basis of an average value of the amount of phase shift detected by the shift-amount detecting means.

The shift-amount detecting means may include maximum-shift-amount detecting means for detecting a maximum amount of phase shift, and minimum-shift-amount detecting means for detecting a minimum amount of phase shift. The average value of the amount of phase shift may be an intermediate value between the maximum amount of phase shift detected by the maximum-shift-amount detecting means and the minimum amount of phase shift detected by the minimum-shift-amount detecting means.

The shift-amount detecting means may include adding means for accumulating the amount of phase shift a predetermined number of times. The average value of the amount of phase shift may be an average value of the amount of phase shift accumulated by the adding means.

The shift-amount detecting means may include interval detecting means for detecting an interval over which the amount of phase shift changes, and amplitude detecting means for detecting an amplitude of the change in the amount of phase shift. The correcting means may correct the first reference clock signal on the basis of the interval and the amplitude.

The optical disk recording apparatus may further include phase-defect detecting means for detecting a phase defect of the wobble signal. When the phase-defect detecting means detects a phase defect of the wobble signal, an amount of phase shift detected by the shift-amount detecting means in the detected phase defect may be ignored.

The optical disk recording apparatus may further include radio-frequency (RF) signal reproducing means for, when the optical disk has data recorded thereon, reproducing an RF signal from a region of the optical disk in which the data has been recorded, and third reference clock signal generating means for generating a third reference clock signal on the basis of the RF signal. The shift-amount detecting means may detect an amount of phase shift of the first reference clock signal using the third reference clock signal.

According to an embodiment of the present invention, when a first reference clock signal used for recording is generated on the basis of a wobble signal, a second reference clock signal is generated on the basis of a pre-pit signal, and an amount of phase shift of the first reference clock signal is detected on the basis of the second reference clock signal. An average value of the detected amount of phase shift is used to correct the first reference clock signal, whereby the first reference clock signal that is less affected by the influence of crosstalk can be generated. Therefore, the recording operation can be started without any influence of crosstalk, and can be ended without any influence of crosstalk.

In particular, data is recorded onto an optical disk using the first reference clock signal, and the first reference clock signal is corrected using the second reference clock signal before starting the recording of the data onto the optical disk using the first reference clock signal. Therefore, the influence of crosstalk can be eliminated or reduced even if a pre-pit signal fails to be detected during the recording of the data onto the optical disk.

Further, in the case where it is difficult to generate the second reference clock signal because the data is recorded on the optical disk, the first reference clock signal can be satisfactorily corrected using a third reference clock signal based on an RF signal.

DESCRIPTION OF THE PREFERRED EMBODIMENTS

Figure 1:
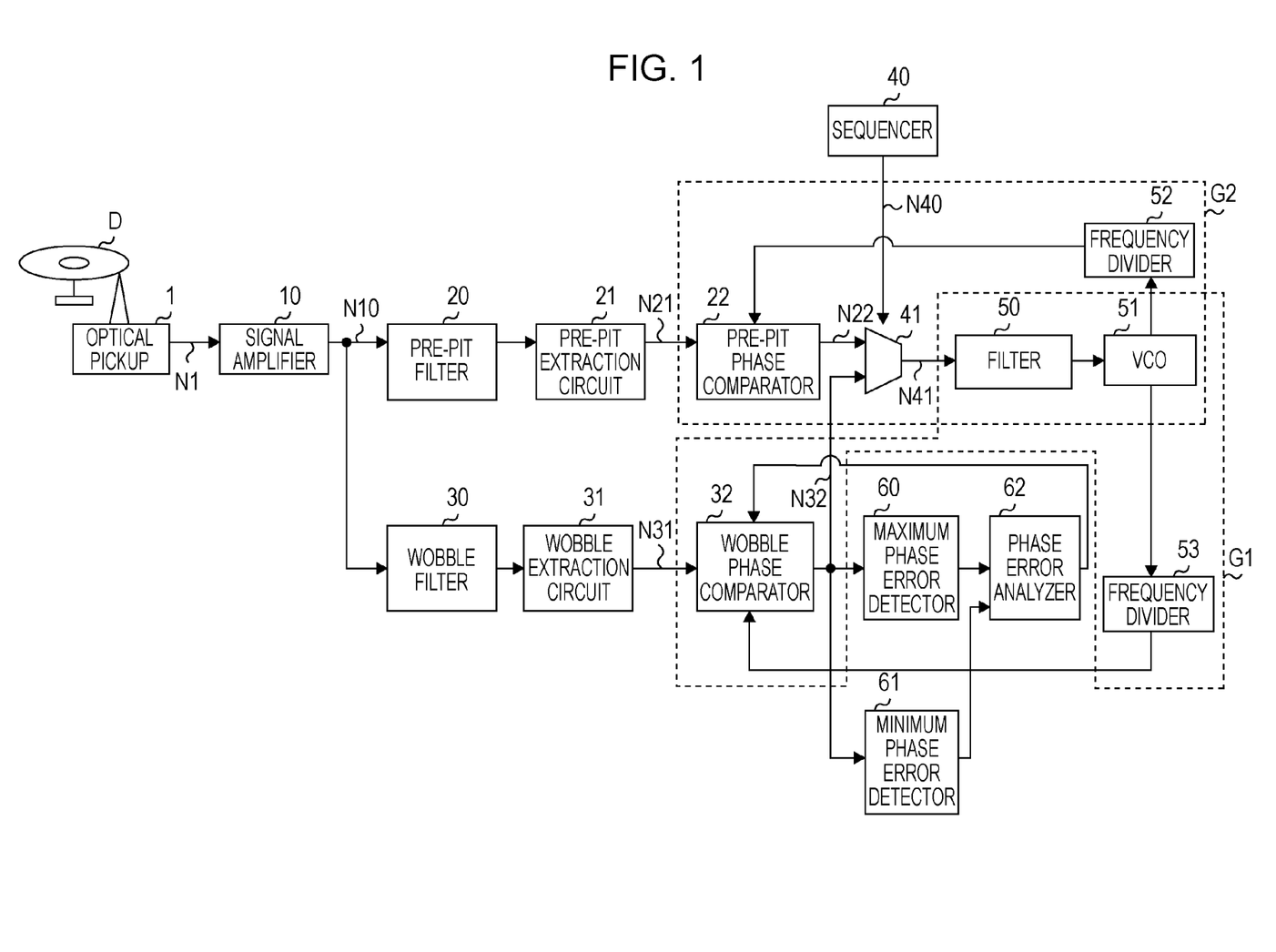
FIG. 1 is a schematic block diagram showing a basic system configuration of an optical disk recording apparatus according to an embodiment of the present invention.

FIG. 1 is a schematic block diagram showing a system configuration of an optical disk recording apparatus according to an embodiment of the present invention.

The optical disk recording apparatus includes an optical pickup 1 that irradiates laser light onto an optical disk D serving as a recording medium to read the laser light reflected from a signal recording surface of the optical disk D. The optical pickup 1 outputs a wobble/pre-pit signal N1 including a wobble signal read from a groove track and a pre-pit signal read from a land track.

The wobble/pre-pit signal N1 is input to a signal amplifier 10. The signal amplifier 10 amplifies the wobble/pre-pit signal N1, and outputs an amplified wobble/pre-pit signal N10.

The amplified wobble/pre-pit signal N10 is input to a wobble filter circuit 30 for desired filtering processing. The amplified wobble/pre-pit signal N10 subjected to the filtering processing is input to a wobble extraction circuit 31 to extract a wobble signal N31, and a wobble phase comparator 32 generates a first phase control signal N32 for the wobble signal reference on the basis of the wobble signal N31.

The amplified wobble/pre-pit signal N10 is also input to a pre-pit filter circuit 20 for desired filtering processing. The amplified wobble/pre-pit signal N10 subjected to the filtering processing is input to a pre-pit extraction circuit 21 to extract a pre-pit signal N21, and a pre-pit phase comparator 22 generates a second phase control signal N22 for the pre-pit signal reference on the basis of the pre-pit signal N21.

Figure 2:
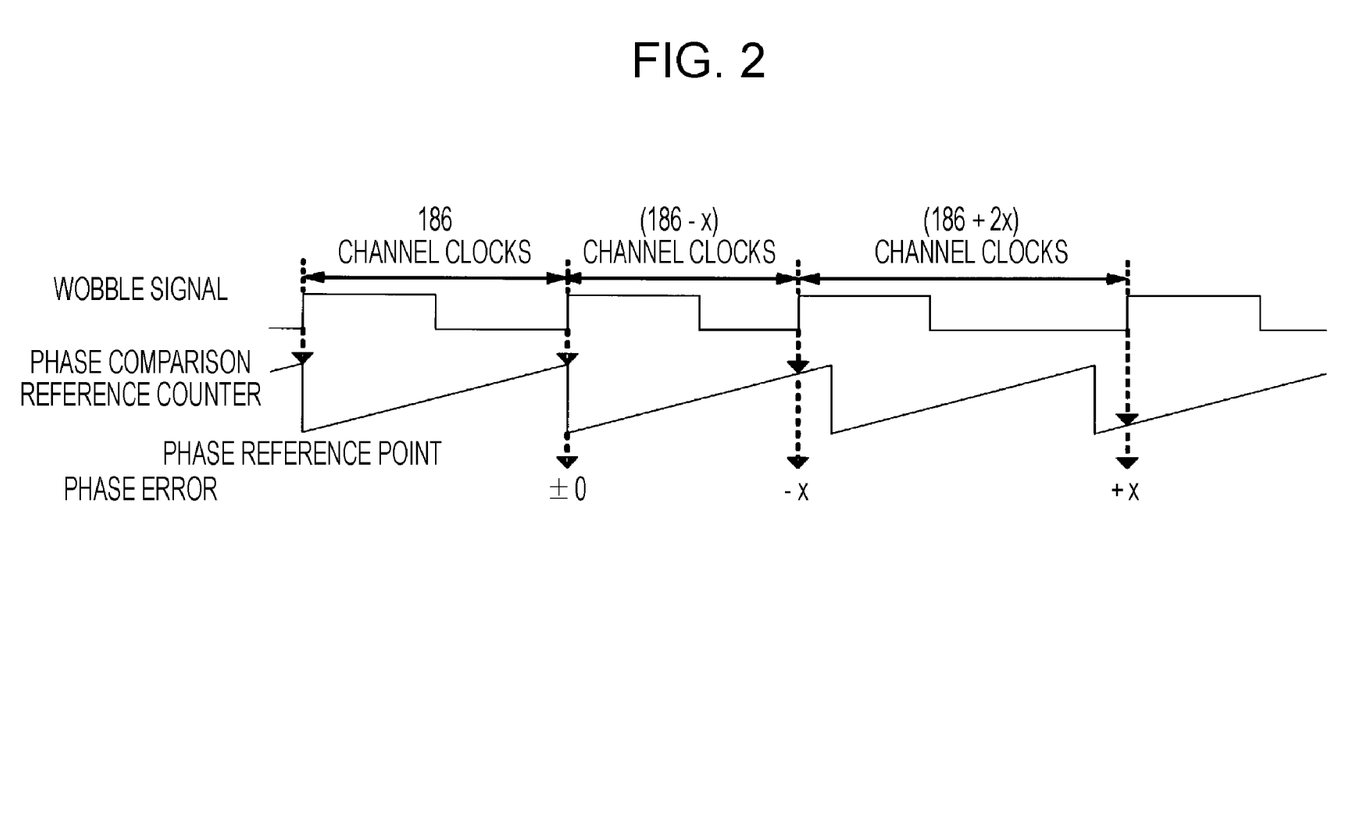
FIG. 2 is a diagram showing an example of phase comparison.

FIG. 2 shows the timing in the wobble phase comparator 32. Since one wobble cycle generally corresponds to a period of 186 channel clocks, the wobble phase comparator 32 is based on the outputs of a phase comparison counter provided at intervals of 186 channel clocks starting from a phase comparison reference. In FIG. 2, phase comparison is performed at the rising edge of the wobble signal N31. If the wobble phase comparator 32 has a count value less than 186/2, the measured value is determined as a phase error value. If the wobble phase comparator 32 has a count value not less than 186/2, a value obtained by subtracting 186 from the count value is determined as an error value.

The optical disk recording apparatus further includes a sequencer 40 implemented by a general-purpose central processing unit (CPU). The sequencer 40 outputs a phase-control-signal selection signal N40 for selecting a phase control signal to be input to a phase-locked loop (PLL) for generating a recording reference clock signal according to the state of a PLL that is to generate a reference clock signal used for recording on the optical disk D or the recording status.

If the first phase control signal N32 is output as a phase control signal N41 selected and output from a selection output circuit 41 on the basis of the phase-control-signal selection signal N40, a first PLL circuit G1 generates a first reference clock signal. If the second phase control signal N22 is output from the selection output circuit 41, a second PLL circuit G2 generates a second reference clock signal. In FIG. 1, the first and second PLL circuits G1 and G2 include a filter circuit 50 and a voltage-controlled oscillator (VCO) circuit 51.

A frequency divider 53 in the first PLL circuit G1 divides the frequency of the first reference clock signal to generate a phase comparison reference. A frequency divider 52 in the second PLL circuit G2 divides the frequency of the second reference clock signal to generate a phase comparison reference.

Figure 3:
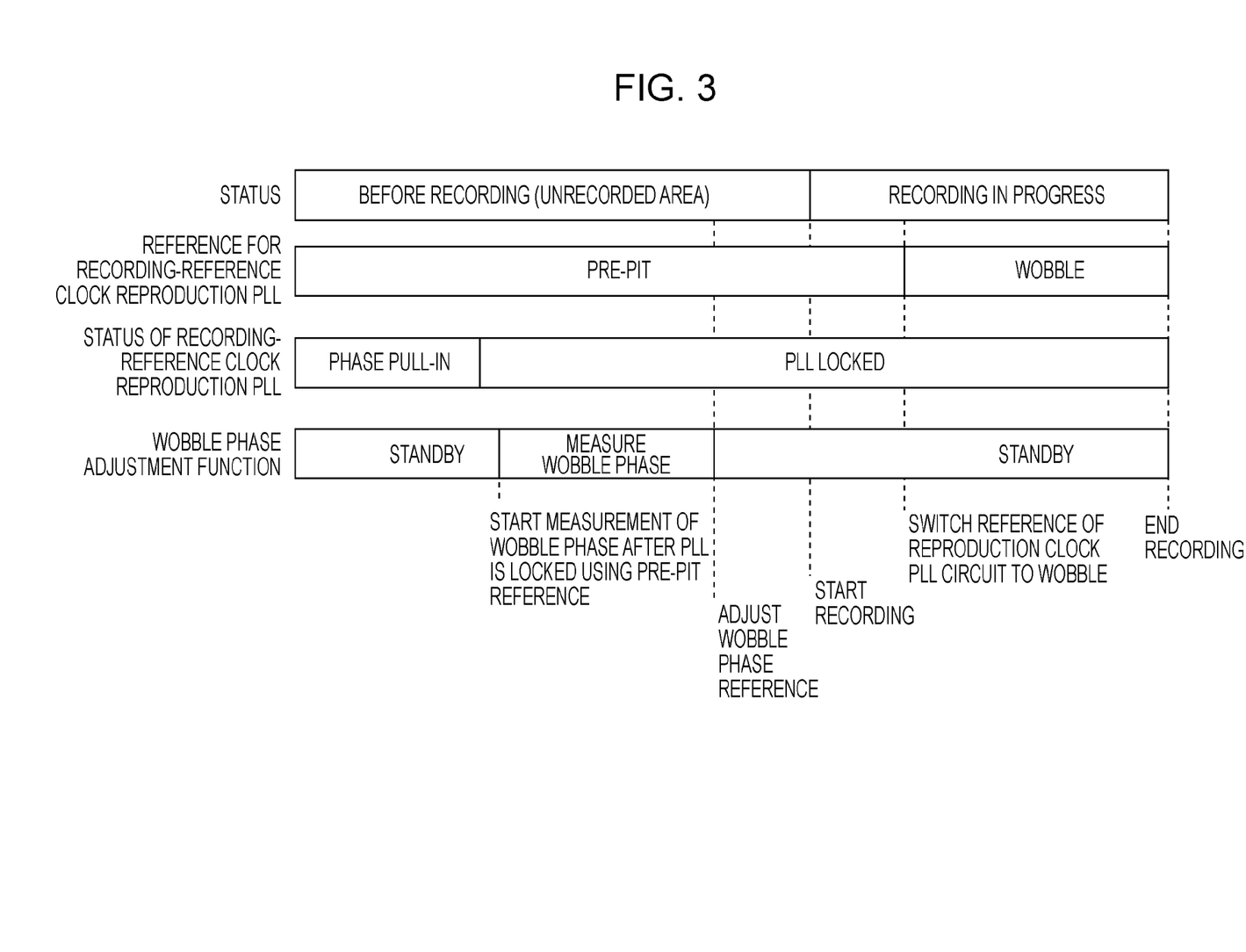
FIG. 3 is a diagram showing a recording state and a sequence for a recording reference clock reproduction PLL.

FIG. 3 shows an example of the operation sequence of the optical disk recording apparatus of the present embodiment. In the optical disk recording apparatus, the sequencer 40 sets the second phase control signal N22 for the pre-pit signal reference as a phase control signal to be input to a PLL for generating a reference clock signal until the first PLL circuit G1 that is to generate the first reference clock signal used for recording has been locked before the recording on the optical disk D. Therefore, during reproduction of the reference clock signal using the second phase control signal N22 for the pre-pit signal reference, the reference clock signal is not affected by the influence of crosstalk.

A maximum-shift-amount (maximum phase error) detection circuit 60 detects a maximum phase error, i.e., a maximum amount of phase shift, of the wobble signal using the second reference clock signal generated by the second PLL circuit G2. A minimum-shift-amount (minimum phase error) detection circuit 61 detects a minimum phase error of the wobble signal.

A phase error analysis circuit 62 determines, as an average amount of shift, an intermediate value between the maximum phase error detected by the maximum-shift-amount detection circuit 60 and the minimum phase error detected by the minimum-shift-amount detection circuit 61, and detects the center position of phase-shift fluctuations caused by crosstalk, i.e., an ideal wobble phase control reference point free from any influence of crosstalk.

The average amount of shift is input to the wobble phase comparator 32 as phase control reference offset information to adjust the first phase control signal N32 for the wobble signal reference.

The center position of phase-shift fluctuations caused by crosstalk may also be determined from records of maximum and minimum values using a digital signal processor (DSP). Therefore, the center position can be determined with higher accuracy.

Figure 4:
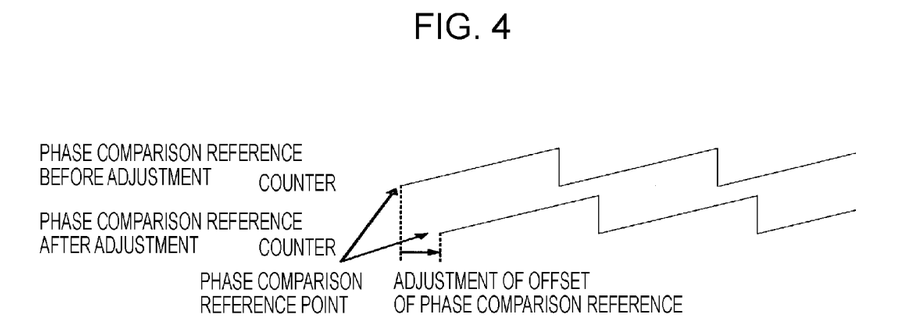
FIG. 4 is a diagram showing adjustment of wobble phase comparison reference.

The first phase control signal N32 is adjusted by, as shown in FIG. 4, applying the amount of offset of the phase control reference point detected by the phase error analysis circuit 62 to the phase comparison counter to displace the phase comparison reference.

Figure 5:
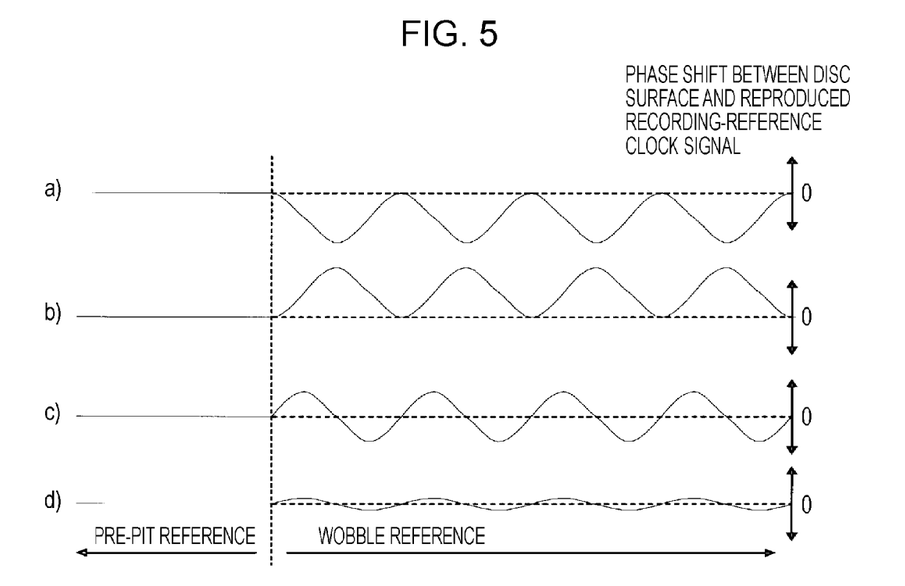
FIG. 5 is a diagram showing the advantages of the embodiment of the present invention.

If the adjustment based on the phase control reference point detected by the phase error analysis circuit 62 is not performed, as shown in part (a) or (b) of FIG. 5, there is a deviation between the phase comparison references for the pre-pit signal and the wobble signal, leading to a possibility of a larger displacement of the recording position. With the adjustment based on the phase control reference point, as shown in part (c) of FIG. 5, the phase comparison reference for the wobble signal can coincide with the phase comparison reference for the pre-pit signal, and therefore the displacement of the recording position can be reduced to a half of that when the adjustment is not performed.

Figure 6:
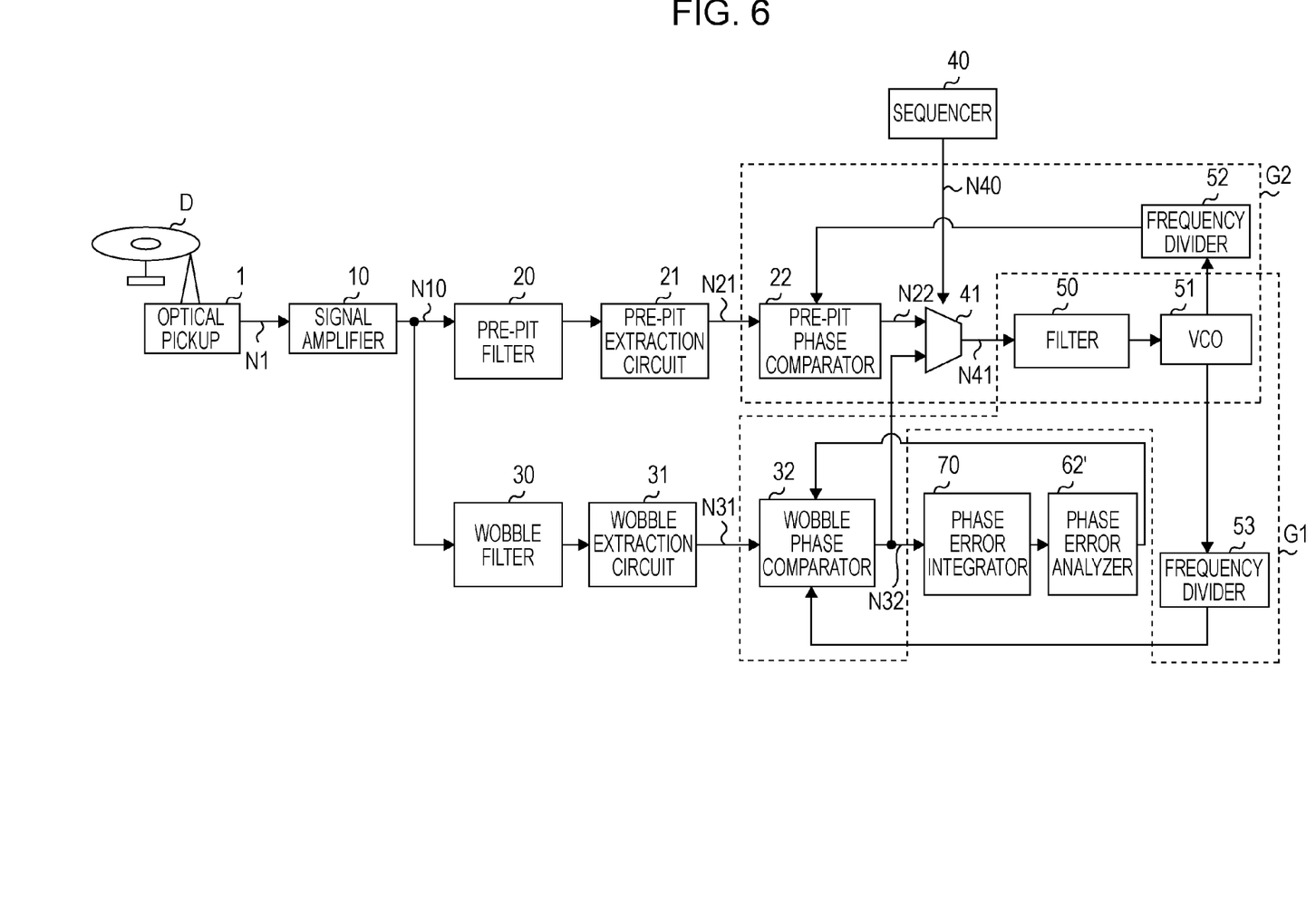
FIG. 6 is a schematic block diagram showing a system configuration of an optical disk recording apparatus according to another embodiment of the present invention.

In the above-described embodiment, the average amount of shift is determined using the maximum-shift-amount detection circuit 60 and the minimum-shift-amount detection circuit 61. According to another embodiment of the present invention, as shown in FIG. 6, an integrator 70 may be provided to accumulate the amount of phase shift a predetermined number of times to determine the accumulated amount of phase shift. A phase error analysis circuit 62' determines an average value of the accumulated amount of phase shift to detect the average amount of shift. The detected average amount of shift may be used as the amount of offset of the phase control reference point.

The integrator 70 allows the phase comparison reference for the wobble signal to coincide with that for the pre-pit signal using a simple structure, and the displacement of the recording position can be reduced to a half of that when the adjustment is not performed.

Figure 7:
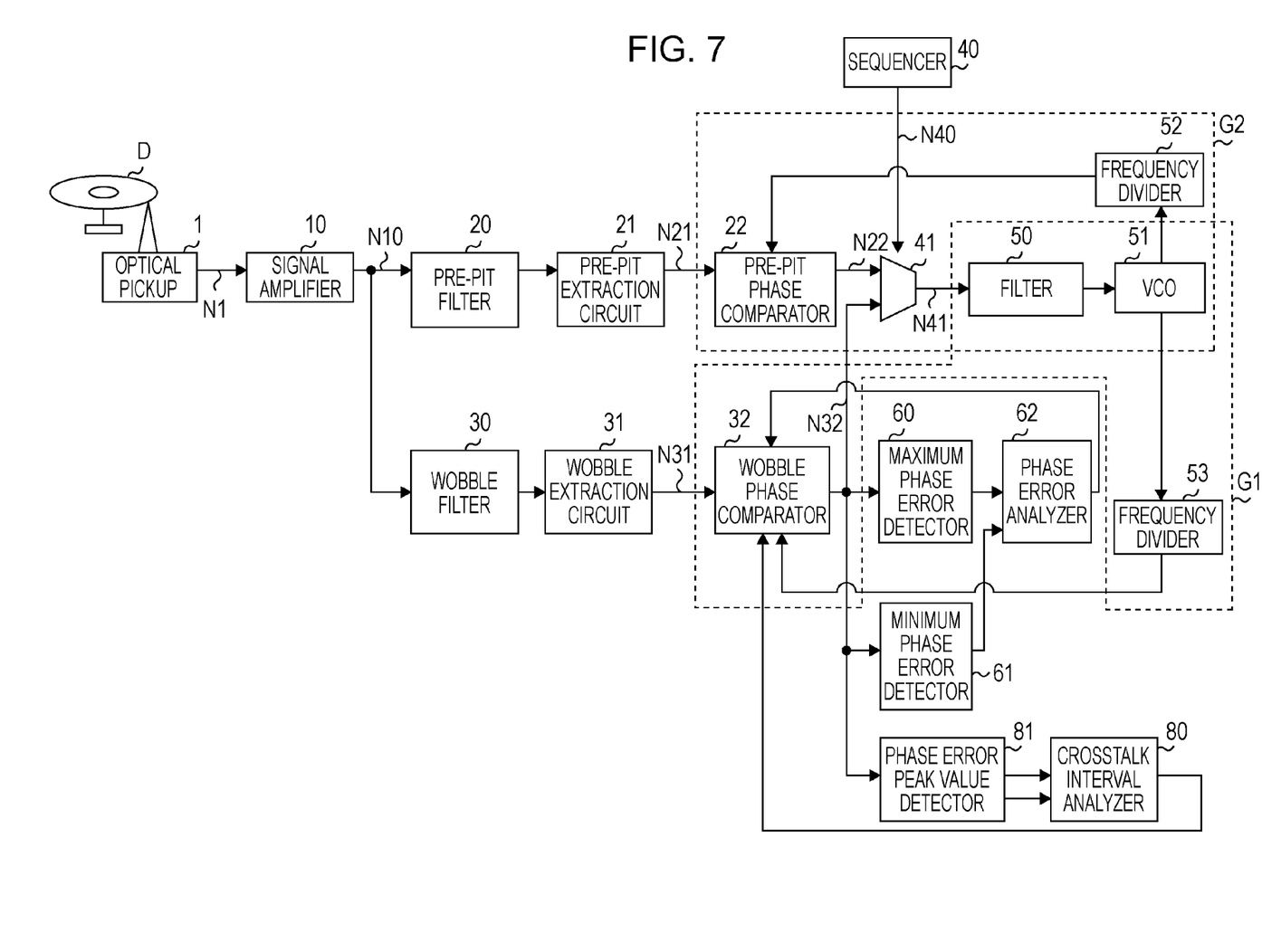
FIG. 7 is a schematic block diagram showing a system configuration of an optical disk recording apparatus according to still another embodiment of the present invention.

In an optical disk recording apparatus according to a further embodiment of the present invention, as shown in FIG. 7, periodic phase-shift fluctuations output from the wobble phase comparator 32 may be analyzed to determine an offset, and the offset may be added to the periodic phase-shift fluctuations to reduce the influence of crosstalk.

Specifically, the optical disk recording apparatus includes an interval detection (crosstalk interval analysis) circuit 80 that detects an interval over which the amount of phase shift changes due to crosstalk, and an amplitude detection (phase error peak value detection) circuit 81 that detects the amplitude of the change in the amount of phase shift. Periodic phase-shift fluctuations are analyzed, and an offset is applied to the phase comparator 32 for the wobble signal in the direction opposite to that of the periodic phase-shift fluctuations. Therefore, as shown in part (d) of FIG. 5, the periodic phase-shift fluctuations caused by crosstalk can be canceled.

Figure 8:
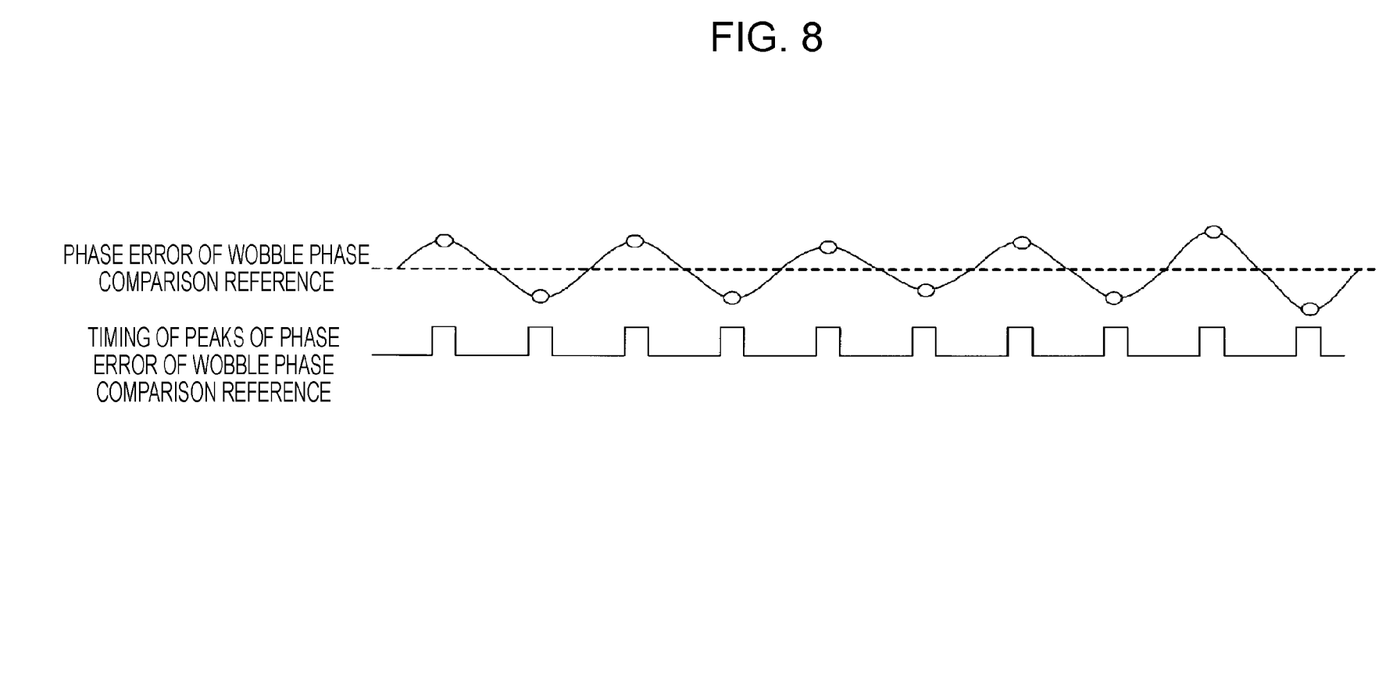
FIG. 8 is a diagram showing an example of detection of phase error peak values.

As shown in FIG. 8, the amount of shift of the phase comparison reference for the wobble signal periodically fluctuates due to crosstalk, and peaks appear at constant intervals. Therefore, the amplitude of the change in the amount of shift is detected by comparing the peak position of the current amount of shift with that of the previous amount of shift. Frequency analysis of crosstalk is conducted to provide information concerning the timing of detection of peaks.

Figure 9:
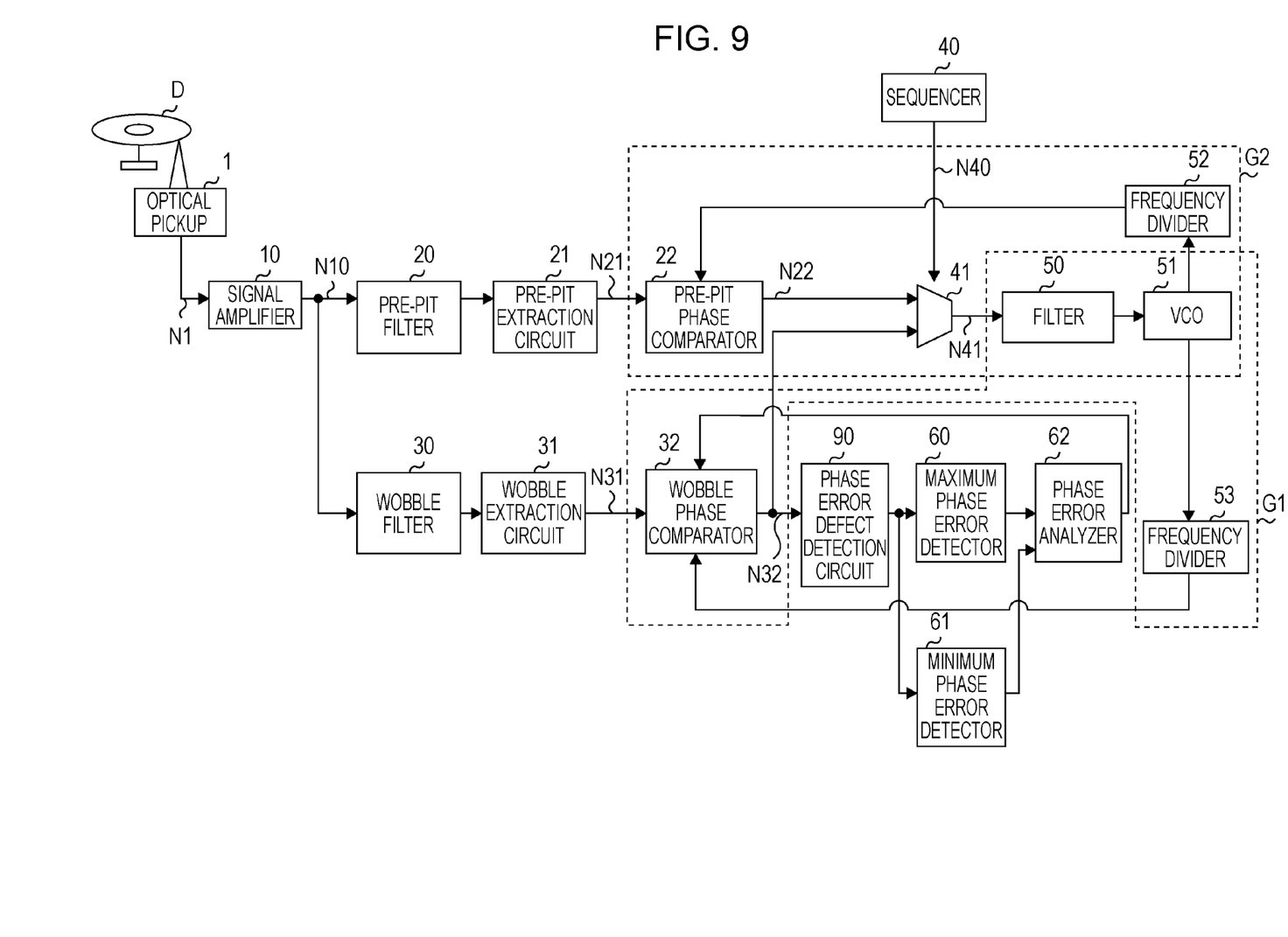
FIG. 9 is a schematic block diagram showing a system configuration of an optical disk recording apparatus according to still another embodiment of the present invention.

According to a still further embodiment of the present invention, as shown in FIG. 9, a defect detection circuit 90 serving as a phase-defect detector detecting a phase defect of the wobble signal may be provided. When the defect detection circuit 90 detects a defect in the phase of the wobble signal output from the wobble phase comparator 32, an amount of shift detected in the detected defect portion is ignored to prevent the occurrence of malfunction due to a defective signal caused by scratches on the medium or the like.

The quality of the wobble signal may be degraded by scratches on the medium as well as the phase shift induced by crosstalk.

If the signal quality is low, the amount of phase shift may not be correctly detected. An analysis based on such an incorrect phase error may provide inaccurate detection of the center of phase-shift fluctuations induced by crosstalk. Therefore, by detecting and eliminating a defective phase error, the center of the phase-shift fluctuations induced by crosstalk can be more accurately detected.

Furthermore, in the optical disk recording apparatus, when the optical disk D is not blank and is recorded with predetermined data, it is difficult to read a pre-pit signal from the region where the data has been recorded. Therefore, the second reference clock signal based on the pre-pit signal may not be generated.

Figure 10:
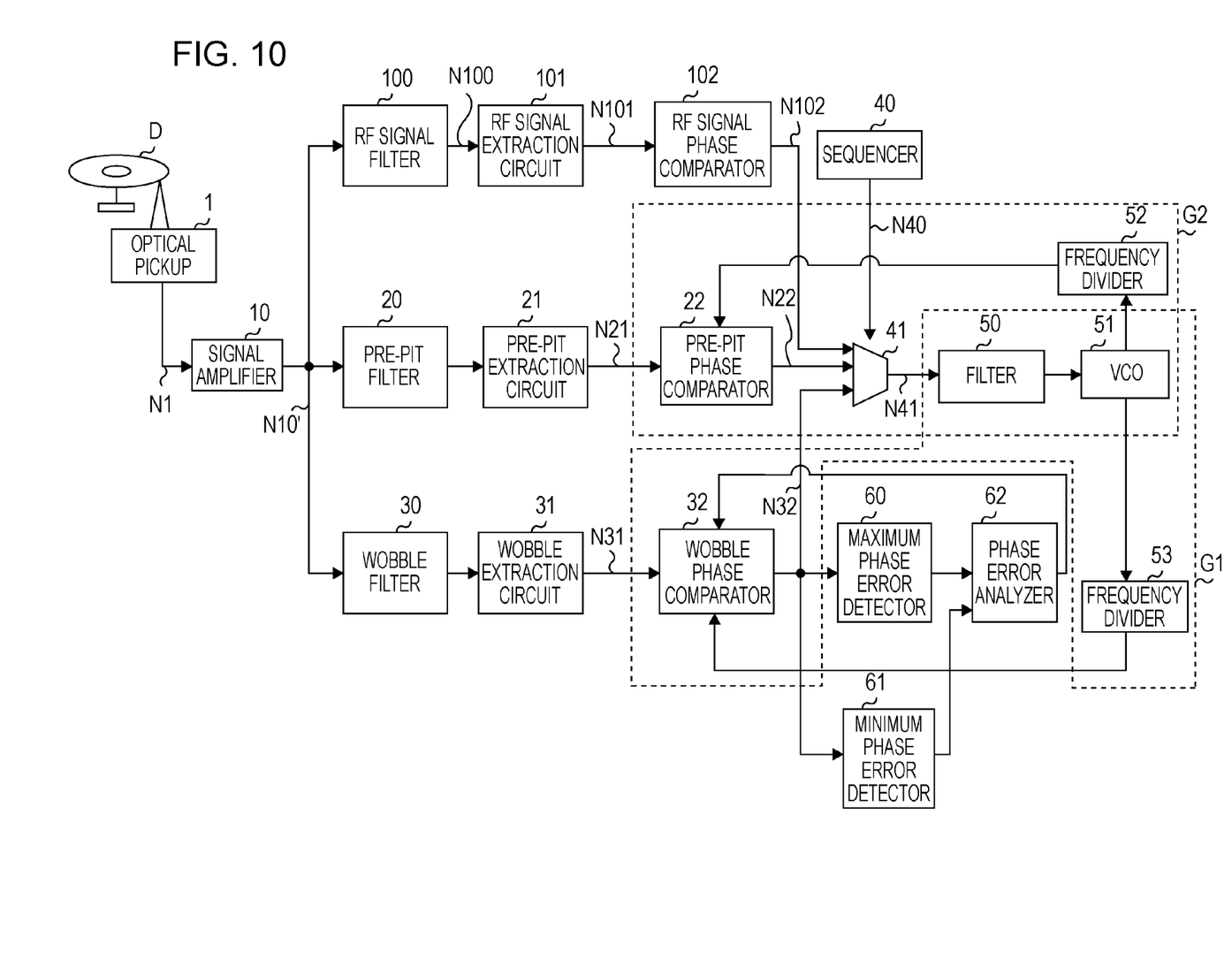
FIG. 10 is a schematic block diagram showing a system configuration of an optical disk recording apparatus according to still another embodiment of the present invention.

To address this problem, as shown in FIG. 10, an amplified signal N10' is input to an RF signal filter circuit 100 for predetermined filtering processing. An amplified signal N100 subjected to the filtering processing is input to an RF signal extraction circuit 101 to extract an RF signal N101, and an RF signal phase comparator 102 generates a third phase control signal N102 for the RF signal reference on the basis of the RF signal N101.

The PLL circuit is locked using the third phase control signal N102 instead of the second phase control signal N22, thereby correcting the first phase control signal N32.

Figure 11:
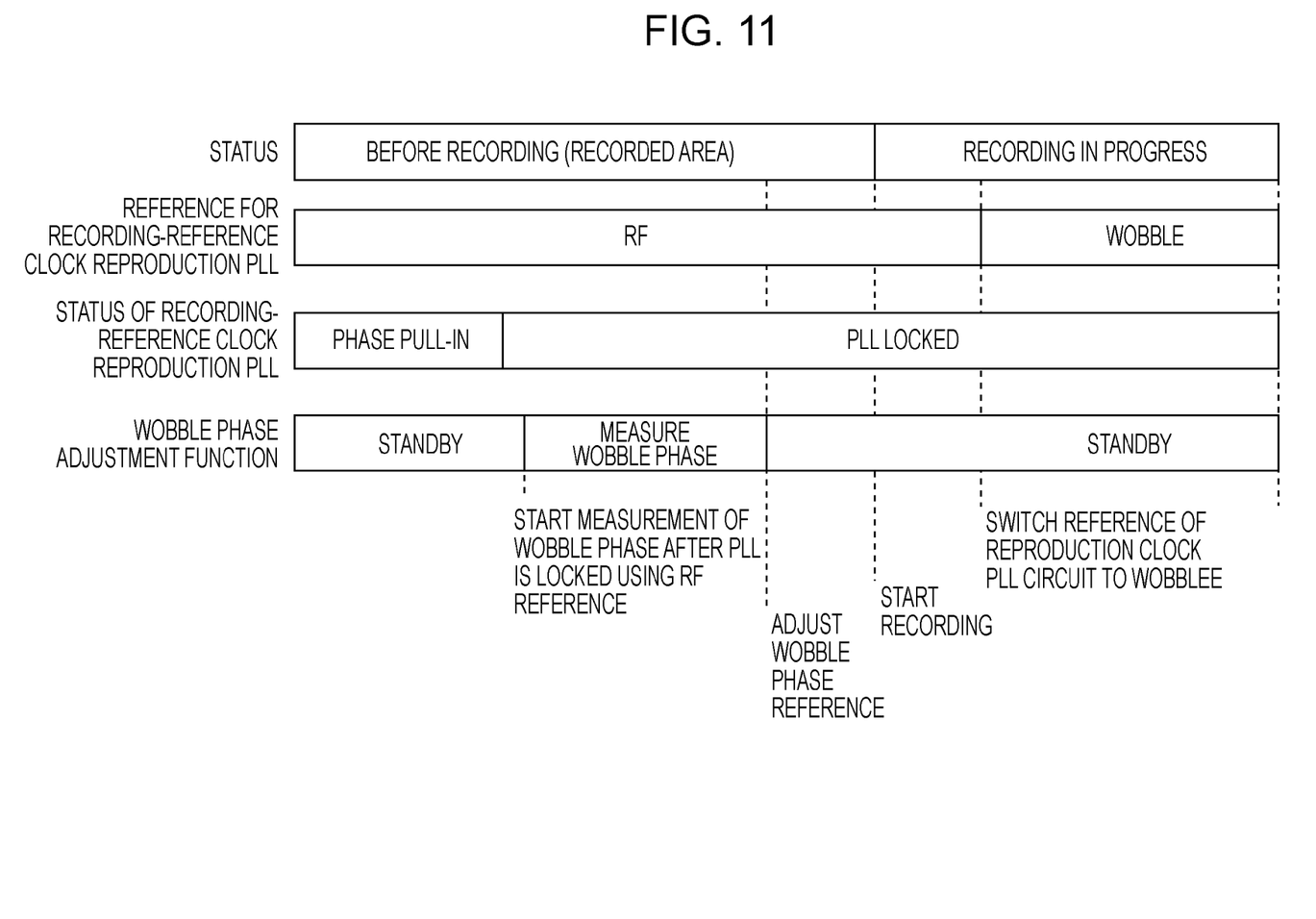
FIG. 11 is a diagram showing a recording state and a sequence for a recording reference clock reproduction PLL.

FIG. 11 shows an example of the operation sequence of the optical disk recording apparatus using an RF signal. In the optical disk recording apparatus, the sequencer 40 sets the third phase control signal N102 for the RF signal reference as a phase control signal to be input to a PLL for generating a reference clock signal until the first PLL circuit G1 that is to generate the first reference clock signal used for recording has been locked before the recording on the optical disk D. Therefore, during reproduction of the reference clock signal using the third phase control signal N102 for the RF signal reference, the reference clock signal is not affected by the influence of crosstalk.

With the use of the third phase control signal N102 for the RF signal reference, even if it is difficult to detect a pre-pit signal from a recorded region of the optical disk D or from a high-speed multilayer medium suitable for high-speed recording or having multiple layers, the phase control reference is adjusted to a wobble phase comparator on the basis of an RF signal instead of a pre-pit signal. This ensures accurate correction.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk recording method for recording predetermined data on an optical disk on the basis of a first reference clock signal used for recording, the optical disk including a groove track having a wobble signal recorded thereon and a land track having a land pre-pit carrying track position information, the first reference clock signal being generated on the basis of the wobble signal reproduced from the optical disk, the method comprising the steps of:
    reproducing a pre-pit signal from the optical disk;
    generating a second reference clock signal from the pre-pit signal;
    detecting an amount of phase shift of the first reference clock signal using the second reference clock signal; and
    correcting the first reference clock signal on the basis of an average value of the detected amount of phase shift, wherein,
    a first phase control signal or a second phase control signal is selected based upon a phase-control-signal-selection signal such that:
        if the first phase control signal is selected, then the first reference clock signal is generated, and
        if the second phase control signal is selected, then the second reference clock signal is generated.

2. An optical disk recording apparatus for recording predetermined data on an optical disk including a groove track having a wobble signal recorded thereon and a land track having a land pre-pit carrying track position information, the apparatus comprising:
    wobble signal reproducing means for reproducing the wobble signal from the optical disk;
    selection output circuit to select a first phase control signal or a second phase control signal based upon a phase-control-signal-selection signal;
    first reference clock signal generating means for generating a first reference clock signal used for recording from the wobble signal, the predetermined data being recorded on the optical disk on the basis of the first reference clock signal;
    pre-pit signal reproducing means for reproducing a pre-pit signal from the optical disk;
    second reference clock signal generating means for generating a second reference clock signal from the pre-pit signal;
    shift-amount detecting means for detecting an amount of phase shift of the first reference clock signal using the second reference clock signal; and
    correcting means for correcting the first reference clock signal on the basis of an average value of the amount of phase shift detected by the shift-amount detecting means
    wherein,
        if the first phase control signal is selected, then the first reference clock signal is generated, and
        if the second phase control signal is selected, then the second reference clock signal is generated.

3. The optical disk recording apparatus according to claim 2, wherein:
    the shift-amount detecting means includes maximum-shift-amount detecting means for detecting a maximum amount of phase shift, and minimum-shift-amount detecting means for detecting a minimum amount of phase shift; and
    the average value of the amount of phase shift is an intermediate value between the maximum amount of phase shift detected by the maximum-shift-amount detecting means and the minimum amount of phase shift detected by the minimum-shift-amount detecting means.

4. The optical disk recording apparatus according to claim 2, wherein:
    the shift-amount detecting means includes adding means for accumulating the amount of phase shift a predetermined number of times; and
    the average value of the amount of phase shift is an average value of the amount of phase shift accumulated by the adding means.

5. The optical disk recording apparatus according to claim 2, wherein:
    the shift-amount detecting means includes
        interval detecting means for detecting an interval over which the amount of phase shift changes, and
        amplitude detecting means for detecting an amplitude of the change in the amount of phase shift; and
    the correcting means corrects the first reference clock signal on the basis of the interval and the amplitude.

6. An optical disk recording apparatus for recording predetermined data on an optical disk including a groove track having a wobble signal recorded thereon and a land track having a land pre-pit carrying track position information, the apparatus comprising:

wobble signal reproducing means for reproducing the wobble signal from the optical disk;

first reference clock signal generating means for generating a first reference clock signal used for recording from the wobble signal, the predetermined data being recorded on the optical disk on the basis of the first reference clock signal;

pre-pit signal reproducing means for reproducing a pre-pit signal m the optical disk;

second reference clock signal generating means for generating a second reference clock signal from the pre-pit signal;

shift-amount detecting means for detecting an amount of phase shift of the first reference clock signal using the second reference clock signal;

correcting means for correcting the first reference clock signal on the basis of an average value of the amount of phase shift detected by the shift-amount detecting means; and phase-defect detecting means for detecting a phase defect of the wobble signal, wherein when the phase-defect detecting means detects a phase defect of the wobble signal, an amount of phase shift detected by the shift-amount detecting means in the detected phase defect is ignored.

7. An optical disk recording apparatus for recording predetermined data on an optical disk including a groove track having a wobble signal recorded thereon and a land track having a land pre-pit carrying track position information, the apparatus comprising:

wobble signal reproducing means for reproducing the wobble signal from the optical disk;

first reference clock signal generating means for generating a first reference clock signal used for recording from the wobble signal, the predetermined data being recorded on the optical disk on the basis of the first reference clock signal;

pre-pit signal reproducing means for reproducing a pre-pit signal from the optical disk;

second reference clock signal generating means for generating a second reference clock signal from the pre-pit signal;

shift-amount detecting means for detecting an amount of phase shift of the first reference clock signal using the second reference clock signal;

correcting means for correcting the first reference clock signal on the basis of an average value of the amount of phase shift detected by the shift-amount detecting means;

radio-frequency signal reproducing means for, when the optical disk has data recorded thereon, reproducing a radio-frequency signal from a region of the optical disk in which the data has been recorded; and third reference clock signal generating means for generating a third reference clock signal on the basis of the radio-frequency signal, wherein the shift-amount detecting means detects an amount of phase shift of the first reference clock signal using the third reference clock signal.

8. An optical disk recording apparatus for recording predetermined data on an optical disk including a groove track having a wobble signal recorded thereon and a land track having a land pre-pit carrying track position information, the apparatus comprising:

a wobble signal reproducing unit reproducing the wobble signal from the optical disk;

selection output circuit to select a first phase control signal or a second phase control signal based upon a phase-control-signal-selection signal;

a first reference clock signal generator generating a first reference clock signal used for recording from the wobble signal, the predetermined data being recorded on the optical disk on the basis of the first reference clock signal;

a pre-pit signal reproducing unit reproducing a pre-pit signal from the optical disk;

a second reference clock signal generator generating a second reference clock signal from the pre-pit signal;

a shift-amount detector detecting an amount of phase shift of the first reference clock signal using the second reference clock signal; and a corrector correcting the first reference clock signal on the basis of an average value of the amount of phase shift detected by the shift-amount detector;

wherein,
if the first phase control signal is selected, then the first reference clock signal is generated, and
if the second phase control signal is selected, then the second reference clock signal is generated.

* * * * *